Feb. 3, 1970 E. A. FILIPPI 3,492,945
PRACTICE GRENADE
Filed Sept. 27, 1968 3 Sheets-Sheet 1
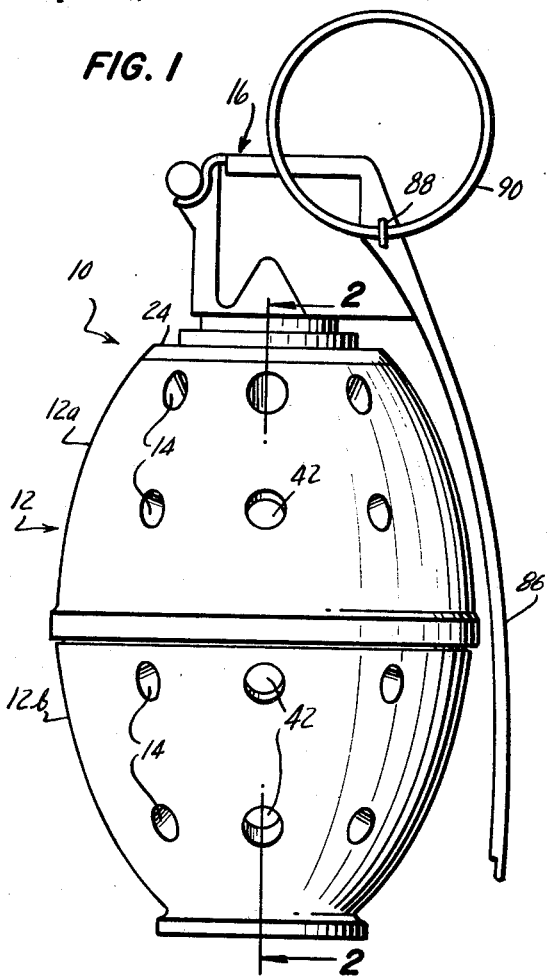
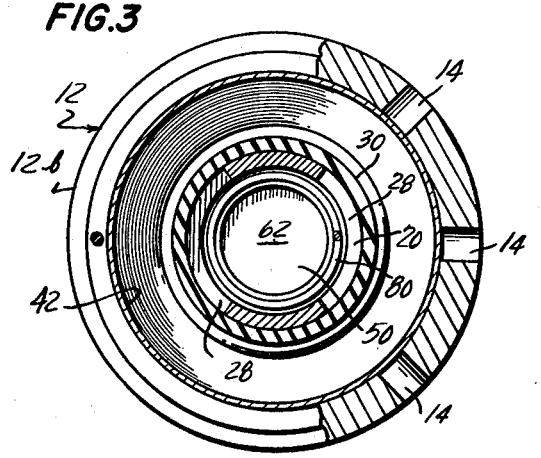
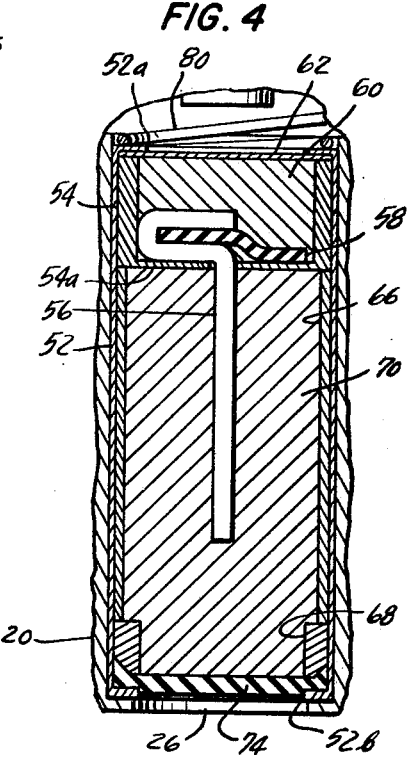
ERNEST A. FILIPPI
INVENTOR.
BY Harvey A. David
Attorneys Feb. 3, 1970

E. A. FILIPPI 3,492,945

PRACTICE GRENADE

Filed Sept. 27, 1968

ERNEST A. FILIPPI
INVENTOR.

BY Harvey A. David
John M. Pearce
Attorneys

Feb. 3, 1970        E. A. FILIPPI        3,492,945
PRACTICE GRENADE
Filed Sept. 27, 1968        3 Sheets-Sheet 3
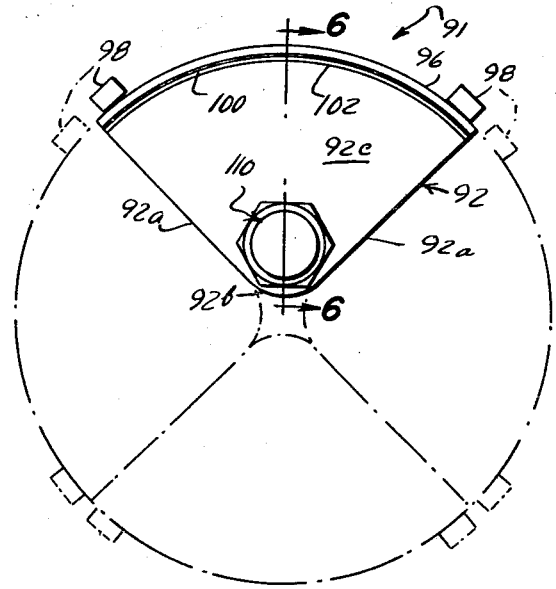
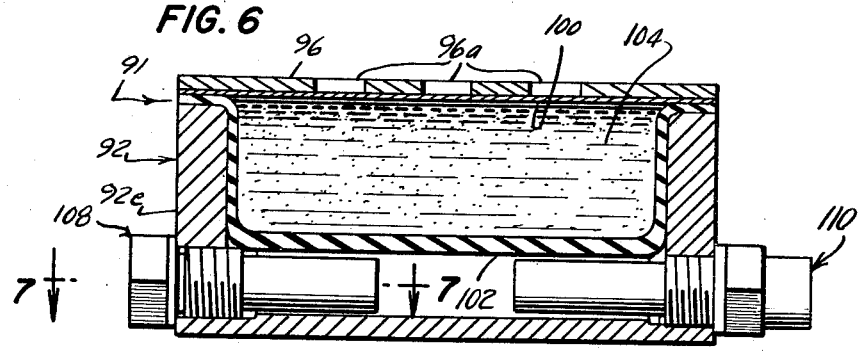
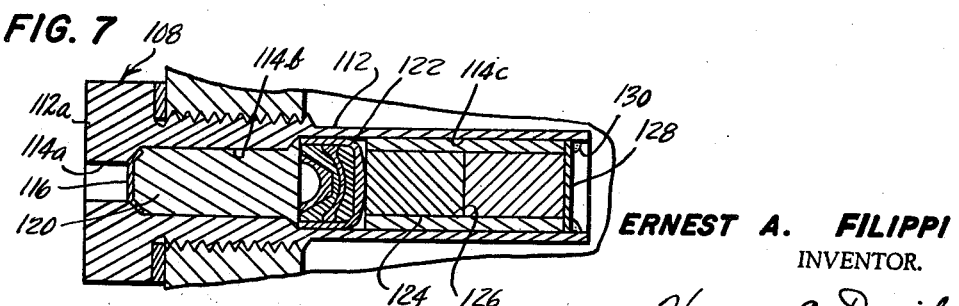
ERNEST A. FILIPPI
INVENTOR.
BY Harvey A. David
John M. Penn
Attorneys United States Patent Office 3,492,945
Patented Feb. 3, 1970

3,492,945
PRACTICE GRENADE
Ernest Anthony Filippi, Northridge, Calif., assignor to Special Devices, Incorporated, Newhall, Calif., a corporation of California
Filed Sept. 27, 1968, Ser. No. 763,146
Int. Cl. F42b 27/10
U.S. Cl. 102—64                                    6 Claims

ABSTRACT OF THE DISCLOSURE

Devices for simulating hand grenades, anti-personnel mines, or booby-traps are disclosed which expel thixotropic dye for scoring simulated hits, and which produce noise, smoke, and flash simulative of actual explosive devices.

BACKGROUND OF THE INVENTION

In the training of soldiers and others, the costs and hazards involved in the use of actual weapons such as hand grenades, anti-personnel mines, booby-traps, and the like, make it desirable to utilize training aids or devices which realistically simulate the feel, appearance, and visual and audible effects of real weapons. Moreover, it is desirable to provide means for scoring hits on personnel by the weapons.

There are various types of grenades, for example, used by the armed forces to train personnel and develop techniques of throwing with accuracy and safety. The types heretofore used have included inert training grenades, small charge practice grenades, pyrotechnic grenades, and operational or service grenades. Of these, the inert and small charge devices fail to provide adequate audio and visual effects, the pyrotechnic devices and service grenades are hazardous in use, and none of the devices permit safe scoring of personnel hits.

BRIEF SUMMARY OF THE INVENTION

With the foregoing in mind, it is a primary object of this invention to provide an improved training device which provides a suitable level of noise, flash, and smoke for use in simulating the effects of a hand grenade, booby-trap, or the like.

Another object of the invention is the provision of a noise, flash and smoke producing device which also projects droplets of marker dye in a predetermined pattern which droplets will indicate hits on personnel contacted thereby so as to permit scoring during training exercises.

Yet another object of the invention is the provision of a training device of the foregoing character and which may be reloaded with dye, and pyrotechnic and propellant charges for repeated usage.

As another object this invention aims to provide a training device which in one embodiment is in the form of a hand grenade, and in another embodiment is in the form of a module which can be used as an individual unit or in an assembly of such modules which will provide an amount of flash, noise, smoke, and a pattern of scoring dye droplets determined by the number and arrangement of modules in the assembly.

BRIEF DESCRIPTION OF THE DRAWINGS

The invention may be further said to reside in certain constructions and arrangements of parts by which the foregoing objects and advantages are achieved, as well as others which will become apparent from the following detailed description of the preferred embodiments when read in conjunction with the accompanying sheets of drawings forming a part of this specification, and in which:

FIG. 1 is a side elevational view of a simulated hand grenade device embodying the invention;

FIG. 3 is a transverse sectional view taken substantially along line 3—3 of FIG. 2, but on the scale of FIG. 1;

FIG. 4 is a sectional view of a portion of the device as viewed along line 4—4 of FIG. 2;

FIG. 5 is a plan elevational view of another device embodying the invention;

FIG. 6 is a sectional view of the device of FIG. 5 taken substantially along line 6—6 thereof; and FIG. 7 is an enlarged sectional view of a portion of the device of FIG. 5 taken substantially along line 7—7 of FIG. 6.

DESCRIPTION OF THE PREFERRED EMBODIMENTS

Figure 2:
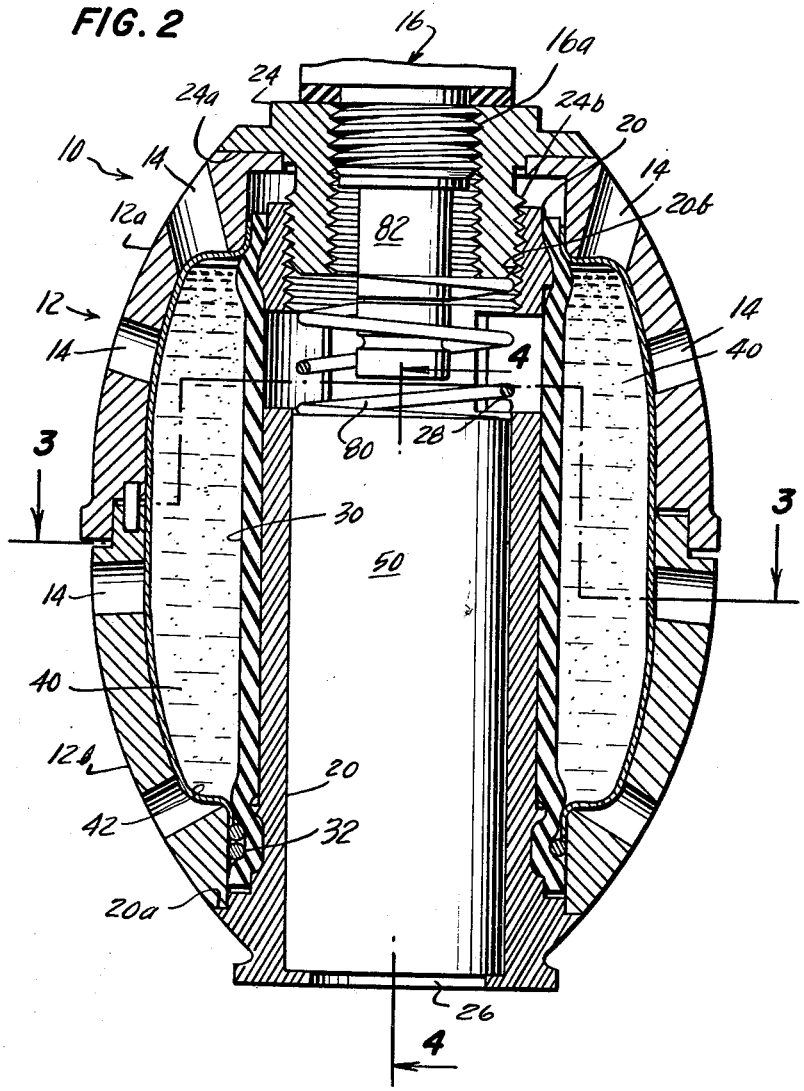
FIG. 2 is a vertical sectional view taken substantially along line 2—2 of FIG. 1 but on an enlarged scale.

In the embodiment of the invention illustrated in FIGS. 1–3, there is provided a practice hand grenade, generally indicated at 10. The grenade 10 generally comprises a hollow body 12 which is shaped to resemble an operational grenade, but has a plurality of openings 14. A conventional fuze assembly 16 is mounted on the body 12 in the usual manner common to grenades. The body 12, which is described in more detail hereinafter, contains a thixotropic dye, a propellant for expelling the dye through the openings 14, and explosive material for creating flash, smoke, and noise simulative of an actual grenade.

The body 12 is conveniently formed of two cup shaped members 12a and 12b which are removably secured together. The body members 12a and 12b have axially aligned openings therein, with the openings in the member 12b receiving a tubular member 20 having a shoulder 20a which engages the body member 12b at the periphery of the opening in which the member 20 is received. The tubular member 20, which has its inner end internally threaded at 20b, is retained by a bushing 24 having a flange 24a and a reduced, externally threaded portion 24b. The latter extends into the central opening of the body member 12a and engages the threaded end 20b of the tubular member 20, the bushing being tightened so that the flange 24a and shoulder 20a are drawn together thereby clamping the body members 12a and 12b together.

The tubular member 20, which forms a re-entrant wall within the body 12, is provided with an opening 26 at its end external of the body 12, and with ports 28 adjacent the internally threaded portion 20b. The purpose of the opening 26 and ports 28 will become apparent as this specification proceeds.

Surrounding the tubular member 20 is an elastomeric, tubular bladder 30, the bladder being conveniently clamped at one end to the tubular member 20 by a spring retainer ring 32. The other end of the bladder 30 is clamped between the inner end of the tube 20 and the inner surface of the body member 12a. There is thereby defined between the walls of the body 12 and the bladder 30, and annular chamber which communicates with the exterior of the device 10 via the openings 14.

The annular chamber is loaded with a thixotropic dye material 40, that is to say a material which is substantially solid at normal temperatures and pressures but which becomes fluent at elevated pressures. The dye material 40 is preferably confined within a rupturable liner or gasket 42 which spans the openings 14.

The thixotropic dye 40 is adapted to be driven through the gasket 42 and openings 14 by expansion of the bladder 30 under the influence of an explosive or gas generating charge forming part of a cartridge 50 which is disposed in the tubular member 20. The cartridge 50, which is best illustrated in FIG. 4, comprises a cylindrical case 52 which is divided into two sections by the bottom wall 54a of a cup 54 pressed into one end of the case.

The wall 54a has a central opening through which a length of fuze 56 extends. The portion of the fuze 56 extends into the cup 54, is folded around a flexible sealing member 58 and terminates in a charge 60 of powder contained in the cup. The charge 60 is confined by a closure in the form of a disc 62 of combustible paper or the like. The disc 62 is retained against the cylindrical wall of the cup 54 by a crimped edge 52a of the case 52.

The portion of the case 52 on the side of the wall 54a remote from the charge 60 contains a cylindrical liners or spacers 66, 68, and is loaded with a noise, smoke, and flash producing charge 70. The charge 70 surrounds the portion of the fuze 56 which extends to that side of the wall 54a, the charge 70 being confined by a diaphragm 74 which is retained between the spacer 68 and a crimped edge 52b of the case.

During assembly of the device 10, the cartridge 50 is placed in the cylinder 20 with the disc 62 toward the fuze assembly 16 and the diaphragm 74 toward the opening 26. The cartridge 50 is biased toward the opening 26 by one end of a spring 80, the other end of which reacts against the bushing 24.

The fuze assembly 16 may be of any well known construction which incorporates a suitable delay prior to combustion of an igniting charge. In the present example the fuze assembly 16 comprises a threaded portion 16a received in the internal threads of the bushing 24 and a tube 82 which contains the igniting charge and terminates adjacent the disc 62 of the cartridge 50. The remainder of the assembly 16 is of a standard construction wherein a hammer (not shown) is held cocked by a handle 86 which is in turn held in the illustrated position by a pin 88. When the pin 88 is removed, as by pulling on a ring 90, the handle 86 is free to spring outwards and release the hammer. This structure is well known. Suffice it to say that the hammer strikes a percussion cap which ignites a Bouchant (delay) fuze and that after a predetermined delay the igniting charge in the tube 82 is ignited.

The igniting charge burns through the disc 62, igniting the charge 60. Combustion of the charge 60 produces gases with substantial pressure which distends the bladder 30 and expels the dye 40 through the openings 14. Droplets of the dye, which is conveniently red in color, are thrown in a pattern determined by the locations of the openings 14 and serve to mark personnel or objects whereby simulated hits may be scored.

The pressure generated by the charge 60 causes the flexible member 58 to seal the opening in the wall 54a around the fuze 56 which is ignited by the charge 60. The fuze 56 transfers ignition to the charge 70. Combustion of the charge 70 bursts the diaphragm 74 to produce noise, smoke, and flash if desired to simulate the effects of an actual grenade.

In the embodiment of the invention illustrated in FIGS. 5–7, there is provided a device 91 which may be referred to as a universal scoring module in that it may be utilized to simulate the effects of a variety of anti-personnel and booby-trap type of explosive devices. Thus, the device 91 comprises a generally hollow, trough shaped metal body 92 having two walls 92a at 90° to one another and joined by a curved portion 92b. The side walls 92a are joined also by parallel end walls 92c which are in the form of quadrants of a circle.

A curved apertured wall member 96 is secured to the body 92 as by screws 98 with the edges of a gasket 100 and a bladder 102 clamped between the wall member and the body. A thixotropic dye material 104 is contained in the chamber formed by the gasket and bladder, the gasket serving to seal the apertures 96a in the wall member.

The end walls 92c are provided with threaded openings, one of which receives a cartridge 108, and the other of which may receive a fuze assembly 110. The cartridge 108, best illustrated in FIG. 7, comprises a case 112 having a stepped bore, the smallest portion of which opens at 114a through a hex-head portion 112a of the case. The next larger portion 114b of the bore is separated from the portion 114a by a rupturable diaphragm 116 and carries a pyrotechnic charge 120 for producing noise and smoke.

The next larger portion 114c of the bore is separated from the portion 114b by a percussion primer 122 and is loaded with a prime charge 124 which is disposed in a sleeve 126. The sleeve and prime charge are retained by a combustible disc 128 which is secured by a suitable adhesive at 130.

The fuze assembly 110 is threadedly received in the opening of the wall 92c opposite that in which the cartridge 108 is received. The fuze assembly 110 may be of any well known construction which carries an ignition charge and may be activated as by a pull cord, shock, electric current, or the like, the type of fuze assembly 110 being selected in accordance with the character of the simulation to be achieved. Suffice it to say that combustion of the ignition charge in the assembly 110 causes the disc 128 to transfer ignition to the prime charge 124. The latter produces gas under sufficient pressure to distend the bladder 102 and expel the dye 104 through the gasket 100 and apertures 96a.

The heat of the prime charge combustion causes the primer 122 to ignite the pyrotechnic charge 120 for its resulting effects.

The shape of the device 91, which may be characterized as a segment or quadrant of a cylinder, permits a plurality of two or more of the devices to be assembled together as illustrated in phantom in FIG. 5, whereby greater pyrotechnic effects may be achieved as well as a larger pattern of disperison of dye droplets. Thus, where one device 91 will provide about 90° of dye coverage, two will provide 180° of coverage, and so on to 360° of coverage.

What is claimed is:
1. A device for simulating effects of an explosive weapon, said device comprising:
   body means defining a cavity and including apertured wall means having a plurality of apertures communicating between said cavity and the exterior of said body means;
   bladder means in said cavity of said body means, said bladder means and said apertured wall means defining a dye chamber on one side of said bladder means;
   a quantity of dye material disposed in said dye chamber;
   a first explosive charge disposed in said cavity on the other side of said bladder means;
   a second explosive charge disposed in said cavity;
   charge separating means between said charges and operative to withstand gas pressure generated by said first charge and to transfer ignition from said first charge to said second charge whereby said gas pressure will distend said bladder to expel said dye material through said apertures and said second charge will provide noise and smoke;
   fuze means for igniting said first charge;
   said first and second charges being contained in a cartridge which is replaceably received within said body means; and
   a gasket disposed between said dye material and said apertured wall means and spanning said apertures, said gasket being rupturable to release said dye material through said apertures under the influence of said gas pressure.

2. A device as defined in claim 1, and wherein said body means comprises:

first and second cup shaped body members removably disposed in mated relation to form said cavity and having aligned openings;

a tubular member extending through the opening of one of said body members and having a shoulder at one end engaging that body member, said tubular member having its other end threaded; and a threaded bushing extending through the opening of the other body member and having a shoulder engaging that body member, said bushing being threadedly engaged with said tubular member so as to clamp said body members together.

3. A device as defined in claim 2, and wherein: said cartridge is removably received in said tubular member.

4. A device as defined in claim 1, and wherein: said body means is in the shape of an aliquot segment of a cylinder, said apertured wall being curved whereby a plurality of said devices may be grouped together to provide a predetermined degree of dispersion of said dye material.

5. A device as defined in claim 4, and wherein said body means comprises: a trough shaped body member, said apertured wall means comprising a curved plate being removably secured to said body member with said bladder means clamped therebetween, said body member having parallel, quadrant shaped end walls each having an opening.

6. A device as defined in claim 5, and wherein:

said cartridge is removably received in the opening of one of said end walls; and said fuze means is removably received in the opening of the other of said end walls and in alignment with said cartridge.

References Cited

UNITED STATES PATENTS

| | | | |
|---|---|---|---|
| 2,094,561 | 9/1937 | Lowy | 102—65 |
| 2,978,144 | 4/1961 | Rilinger et al. | 222—95 |
| 3,194,161 | 7/1965 | Becker et al. | 102—64 |
| 3,240,394 | 3/1966 | Modderno | 222—95 |
| 3,369,486 | 2/1968 | Wrennstad | 102—64 |

BENJAMIN A. BORCHELT, Primary Examiner

JAMES FOX, Assistant Examiner

U.S. Cl. X.R,

222—95

UNITED STATES PATENT OFFICE
CERTIFICATE OF CORRECTION

Patent No. 3,492,945                      February 3, 1970

Ernest Anthony Filippi

It is certified that error appears in the above identified patent and that said Letters Patent are hereby corrected as shown below:

In the heading to the printed specification, lines 3 to 5, "assignor to Special Devices, Incorporated, Newhall, Calif., a corporation of California" should read -- assignor, by mesne assignments, to the United States of America as represented by the Secretary of the Navy --.

Signed and sealed this 17th day of November 1970.

(SEAL)
Attest:

Edward M. Fletcher, Jr.

Attesting Officer

WILLIAM E. SCHUYLER, JR
Commissioner of Patents